United States Patent [19]

Monosov

[11] 4,293,634
[45] Oct. 6, 1981

[54] METHOD OF RECORDING IMAGES ON A RADIATION SENSITIVE MATERIAL

[76] Inventor: Yakov A. Monosov, prospekt Vernadskogo, 99, korpus 1, kv. 204, Moscow, U.S.S.R.

[21] Appl. No.: 139,139

[22] Filed: Apr. 10, 1980

Related U.S. Application Data

[63] Continuation of Ser. No. 916,363, Jun. 16, 1978, abandoned.

[30] Foreign Application Priority Data

Nov. 25, 1977 [SU] U.S.S.R. ............................. 2543210
Dec. 21, 1977 [SU] U.S.S.R. ............................. 2555201
Dec. 22, 1977 [SU] U.S.S.R. ............................. 2553262

[51] Int. Cl.³ ............................................. G03C 5/24
[52] U.S. Cl. .................................. 430/269; 430/327; 430/348; 430/349; 430/395; 430/396; 430/330; 430/495; 430/401; 430/403; 430/406; 430/292
[58] Field of Search ............... 96/1 R, 1 E, 1.1, 1.2, 96/1 PS, 48 R, 97, 98, 88; 430/348, 395, 396, 269, 327, 330, 495, 401, 403, 406, 55, 349, 292, 364

[56] References Cited

U.S. PATENT DOCUMENTS

| | | | |
|---|---|---|---|
| 2,798,959 | 7/1957 | Moncrieff-Yeates | 96/1.1 |
| 2,798,960 | 7/1957 | Moncrieff-Yeates | 96/1.2 |
| 3,276,869 | 10/1966 | McCune | 96/97 |
| 3,485,621 | 12/1969 | Kazan | 96/1 R |
| 3,513,449 | 5/1970 | Young | 96/1.1 |
| 3,757,353 | 9/1973 | Jeffers | 430/495 |
| 3,912,505 | 10/1975 | Goffe et al. | 96/1.2 |
| 3,972,715 | 5/1976 | Okumura | 96/1.1 |
| 4,007,045 | 2/1977 | Ishida et al. | 96/1.2 |
| 4,121,932 | 10/1978 | Ishida | 96/1.2 |

FOREIGN PATENT DOCUMENTS 51-4085  2/1976 Japan ................................. 430/269
52-10148 1/1977 Japan ................................. 430/269

OTHER PUBLICATIONS

Kump et al.: Thermostrictive Recording on Permalloy Film, IBM Journal, May 1966, pp. 255-260.
Robillard: New Approaches in Photography, Photographic Science and Engineering, vol. 8, No. 1, Jan.-Feb. 1964.

Primary Examiner—Won H. Louie, Jr.
Attorney, Agent, or Firm—McAulay, Fields, Fisher, Goldstein & Nissen

[57] ABSTRACT

A method of recording images on a radiation sensitive material comprising forming a layer of a radiation sensitive material comprised of a heterogeneous mixture of substances. At least one of the substances of the heterogeneous mixture serves as a binder capable of converting its states of aggregation in the mixture under the action of the intrinsic or reflected radiation obtainable from the object being recorded. Another substance of the heterogeneous mixture, in the form of particles, is capable of interacting with a force field. The layer is introduced in a force field and an image of the object being recorded is projeced on that layer. The produced image is fixed by converting the state of aggregation of the heterogeneous mixture. The proposed method makes it possible to record images in any spectral range of the intrinsic and reflected radiation of the object. Images of any objects can be recorded on that layer containing no silver halides.

17 Claims, 9 Drawing Figures

METHOD OF RECORDING IMAGES ON A RADIATION SENSITIVE MATERIAL

This is a continuation of application Ser. No. 916,363 filed June 16, 1978 now abandoned.

FIELD OF THE INVENTION

This invention relates to representation, storage and processing of data, and more particularly to a method of recording images on a radiation sensitive material.

There is a great variety of domestic and scientific applications, such as photography, motion picture photography, TV transmissions, polygraphy, document copying, which require image recording. Other applications are concerned with optical data processing in computers, with automatic processing of data represented as images on visual displays, with transmission and reception, on large screens, of images of small and distant objects, with telephone channel selection, and with transmission of holographic movie and TV images.

DESCRIPTION OF THE PRIOR ART

Known in the art is a method of recording images on photographic and motion picture films, in which the light acts photochemically on silver halides. The method utilizes a costly material, namely, silver, requires that the recorded image be processed for a long time during the development and fixing and does not allow for the erasing of the fixed images or the recording of a new image on the same place.

Known in the art is another method of recording images on a ceramic plate (cf. IEEE Transactions, 65, 1, 1977, p. 143) comprised of compounds of Pb, Zn, La and Ti. The method utilizes electrooptical interaction of light with an electrically polarized ceramic plate. The method requires no silver, offers short processing time and can provide for the erasing of the old image and for the recording of a new image on the same place. There are, however, some disadvantages of the method as follows: complex process steps; low light sensitivity; low contrast; short time within which the recorded image can be stored; small number of erase and record cycles for a new image; no color images are produced.

Known in the art is a still another method of recording images on a radiation sensitive material, which method comprises the steps as follows: a layer is formed using a radiation sensitive material and is then placed in a force field; an image of the object being recorded is projected on that layer and is then fixed (cf. an article by H. I. Kump, P. I. Chang in the IBM Journal, May 1966, p. 255).

Images can be recorded by utilizing the magnetic hysteresis effect occurred in a magnetic film. It is known that the magnetic state of a ferromagnet characterized by the parameters of the domain structure and the direction of the magnetization vector relative to a certain axis of the crystal depends on the temperature noted at the preceding moment. The method utilizing this phenomenon is called the thermomagnetic recording method. Images are recorded by means of a laser beam which tends to heat the required portion of the film to the Curie or compensation temperature using the light obtained from the object being recorded. Images are fixed by reducing the temperature of the film by several tens or hundreds of degrees.

The recorded images can be observed due to the fact that the magnetic state of the film changes with either the value of the Faraday and Cotton-Mouton magneto-optic effects for MnBi films or with the position of the magnemic colloid deposited on the film surface in the case of FeNi films.

The described method features an extremely low sensitivity with a minimum radiant density of $10^6$ W/cm$^2$. In addition, the light utilization factor, $10^{-5}$ to $10^{-6}$, is very small in image observation since the substances employed have a low magneto-optic quality. As a result, only very sensitive light detectors can be used for observation of the images. With this method, one elemental part of the image, and not the image as a whole, can be recorded at a time. Moreover, the heat is not accumulated when the light is effective for long time periods with the result that a lower limit is imposed on the permissible light flux. This lower limit is appreciably strict since the temperature of the magnetic phase transition is high (about 100° C.) and the thermal conductivity of the magnetic film material is high too.

SUMMARY OF THE INVENTION

An object of the invention is to provide a method of recording images on a radiation sensitive material so that an image of an object can be recorded in any desirable region of the spectral range of the intrinsic or reflected radiation of the object, including acoustic, radiofrequency, visible-light and X-ray bands.

Another object of the invention is to provide for recording of images of any objects on a layer not containing silver halides.

A still another object of the invention is to provide for positive images not requiring additional processing.

A yet another object of the invention is to provide for visual readout of recorded images.

Another object of the invention is to provide for higher sensitivity and contrast as well as good image replacement capability of the radiation sensitive material.

Another object of the invention is to provide for the production of color images.

Another object of the invention is to provide for the production of copies in lighted rooms.

Another object of the invention is to provide for intensification of the brightness of the produced images.

There is disclosed a method of recording images on a radiation sensitive material comprising forming a layer of a radiation sensitive material, introducing the layer into a force field, projecting an image of an object being recorded on the layer and fixing the projected image, which method utilizes, according to the invention, a heterogeneous mixture of substances as a radiation sensitive material, at least one of said substances being used as a binder and being capable of converting its states of aggregation in the mixture under the action of the intrinsic or reflected radiation obtainable from the object being recorded and the other(s), present in said heterogeneous mixture of substances in the form of particles, being capable of interacting with the force field, the image being projected using the intrinsic or reflected radiation from the object being recorded, and the projected image being fixed by converting the state of aggregation of the substance which serves as the binder of the heterogeneous mixture.

Advantageously, the layer of the heterogeneous mixture of substances is heated or cooled, prior to or at the moment that the image is recorded, to a temperature close to that at which the substance serving as the binder changes its state of aggregation.

Preferably, a radiation-absorbing substance, having its radiant/thermal energy conversion factor greater than that of another substance present in the heterogeneous mixture and capable of interacting with a force field, is added to the heterogeneous mixture prior to forming the layer and is then deposited on the particles capable of interacting with the force field.

Advantageously, a layer is formed using at least one radiation-absorbing substance having its radiant/thermal energy conversion factor greater than that of another substance present in the heterogeneous mixture and capable of interacting with a force field, and is then placed on or under the layer of the heterogeneous mixture of substances relative to the object being recorded.

Preferably, radiation-absorbing substances are photochemically active ones and a layer is formed using a plurality of microcapsules filled with the photochemically active substances.

Advantageously, the radiation-absorbing substance is a substance possessing photoconductivity properties and a layer comprised of the latter substance is placed on the layer of the heterogeneous mixture of substances.

Preferably, the layer of the substance possessing photoconductivity properties is placed under the layer of the heterogeneous mixture of substances and the latter layer is given an additional exposure after the image has been fixed.

Advantageously, the microcapsules are made of a material of a single color as a minimum.

It is preferable that the radiation band colors corresponding to the colors of the object being recorded are discriminated and reproduced on the layer of the heterogeneous mixture of substances during the image recording.

It is advantageous that the projected image is given an additional exposure, prior to or after it is fixed, of a higher radiant intensity as compared to that available during the image recording, the radiation wavelengths occurring during the additional exposure being so selected that they can pass through the layer of the heterogeneous mixture of substances without absorption.

Preferably, an additional exposure is effective prior to the image fixing and the additional exposure time is less than the image record time by that number of times by which the radiant intensity available during the additional exposure exceeds that available during the image recording, provided the identical radiation wavelengths are used during the additional exposure and the image recording.

Advantageously, the radiation sensitive material is comprised of a heterogeneous mixture including paraffin, serving as a binder and capable of melting in the mixture under the action of the intrinsic or reflected radiation obtainable from the object being recorded, and ferric oxide particles, the force field being a magnetic field with which the ferric oxide particles interact, which method comprises the steps as follows: a layer is formed on a transparent substrate using the heterogeneous mixture; an image of the object is projected on the layer; and the projected image is fixed by cooling down the paraffin.

The proposed method of recording images on a radiation sensitive material provides for image recording in any desirable region of the spectral range of the intrinsic and reflected radiation of the object, including acoustic, radio-frequency, visible-light and X-ray bands. The images of any objects can be recorded on a layer not containing silver halides. Positive images not requiring additional processing can be obtained and visual readout of the recorded images is possible. Moreover, copies can be produced in lighted rooms. With this method, higher sensitivity and contrast as well as good image replacement capability of the radiation sensitive material are attained. The method allows for the production of color images and intensification of the brightness of the produced images during recording.

DESCRIPTION OF THE DRAWINGS

The invention will now be described, by way of example, with reference to the accompanying drawings in which.

DESCRIPTION OF THE INVENTION

The method of recording images on a radiation sensitive material includes, according to the invention, the formation of a layer of a radiation sensitive material comprised of a heterogeneous mixture of substances. One of the substances of the heterogeneous mixture serves as a binder and is capable of converting its states of aggregation under the action of the intrinsic or reflected radiation obtainable from the object being recorded, while the other is present in the heterogeneous mixture in the form of particles and is capable of interacting with a force field. There is an embodiment that deals with a number of substances serving as binders and particles respectively.

The layer of the heterogeneous mixture of substances is then introduced into a force field and an image of the object being recorded is projected onto that layer using the intrinsic or reflected radiation of the object. The projected image is fixed by converting the state of aggregation of the substance which serves as the binder of the heterogeneous mixture. If the image is recorded by melting the binder, then the recorded image is fixed by cooling the solvent down to or below its crystallization point. If the image is recorded by subjecting the solvent to sublimation, then the recorded image is fixed by cooling the solvent down to or below its sublimation point.

In order to reduce the energy consumed in recording, the layer of the heterogeneous mixture is heated or cooled, prior to or during the image recording, to the temperature at which the state of aggregation of the substance serving as the binder is maintained.

To provide for further decrease in the energy consumed in recording, a radiation-absorbing substance, having its radiant/thermal energy conversion factor greater than that of another substance present in the heterogeneous mixture and capable of interacting with a force field, is added to the heterogeneous mixture prior to forming the layer of the heterogeneous mixture and is deposited on the particles capable of interacting with the force field.

For the purpose described above, a layer is formed using at least one radiation-absorbing substance having its radiant/thermal energy conversion factor greater than that of another substance present in the heterogeneous mixture and capable of interacting with a force field, and is then placed on or under said layer of the heterogeneous mixture of substances relative to the object being recorded. The radiation-absorbing substance may be a photochemically active substance or a substance possessing photoconductivity properties. In the case of photochemically active substances, the latter are introduced into a plurality of microcapsules which are arranged in the form of a layer. When a substance possessing photoconductivity properties is used, a photoconductor plate connected to a current source is employed. That plate is mounted on the layer of the heterogeneous mixture of substances.

To provide for a higher contrast of the recorded image, the photoconductor plate is positioned under the layer of the heterogeneous mixture of substances and the layer is given an additional exposure after the image fixing.

To obtain color images, the microcapsules are made of a material of a single color as a minimum. For the purpose, use is made of a light filter having an uneven spatial characteristic. The filter is used to discriminate the radiation band colors corresponding to the colors of the object being recorded and to reproduce them in recording the image on the layer of the heterogeneous mixture of substances.

In rewriting the produced image, its brightness is intensified during or after the image recording so that the produced image is given an additional exposure prior to or after its fixing. The intensity of the additional exposure exceeds in this case that available during the image recording; the radiation wavelengths occurring during the additional exposure are so selected that they can pass through the layer of the heterogeneous mixture without absorption. If the additional exposure is effective prior to fixing the image and if the wavelengths occurring during the image recording and the additional exposure are identical, then the additional exposure time is less than the image record time by that number of times by which the radiation intensity available during the additional exposure exceeds that available during the image recording.

To provide for better understanding of the proposed method, consider some aspects of a simplified theory of image recording.

Figure 1:
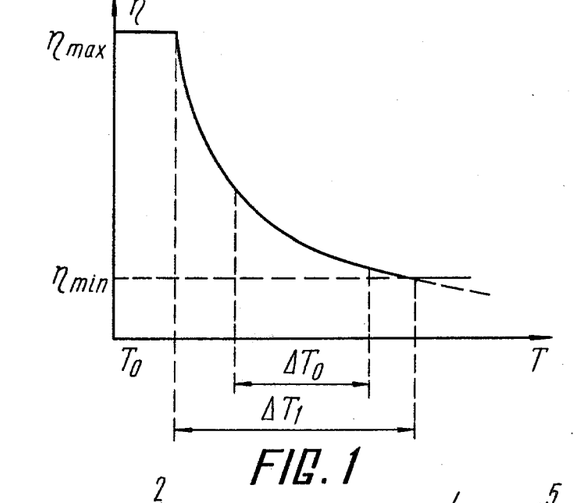
FIG. 1 shows how the viscosity of a binder of a heterogeneous mixture varies with temperature, according to the invention.

The proposed method basically relies on the fact that the state of aggregation of the binder of the heterogeneous mixture is changed under the action of the radiation from the object being recorded. This means that aggregate transitions of types "crystal-liquid" and "crystal-gas" occur. The kinematic coefficients of the solvent tend to vary considerably in the vicinity of these transitions. FIG. 1 illustrates how the viscosity $\eta$ varies with temperature T. In the case of water and paraffin, for example $\eta_{max}/\eta_{min.} = 10^{15}$ to $10^{16}$ at $\Delta T_1 = =0.01°$ to $10°$ C.

Such a marked variation of the binder viscosity results in a considerable change of the mobility of the particles of the heterogeneous mixture which are carriers of electric charges or electric and magnetic dipole moments; this also applies to those particles of the heterogeneous mixture which are capable of interacting with electric, magnetic, gravitational or any other fields which could create a directed movement of the particles. If the particles move in a directed manner, there is a decrease in their density per unit of the illuminated area of the layer of the heterogeneous mixture. If the particles are transparent and if the binder is opaque, then the transparence of the illuminated portion of the layer increases. If the particles are transparent but have a refractive index that differs from that of the binder, then the total refractive index of the illuminated portion of the layer varies.

Described below are formulae according to which the characteristics of the proposed method are calculated. It is assumed that the particles are spheres of radius a.

The resolving power R is determined by $$R = \frac{1}{a} < \frac{2\pi}{\lambda} \qquad (1)$$

where $\lambda$ is the radiation wavelength.

The maximum contrast $\gamma_{max}$ is determined in the case of opaque particles as follows:

$$\gamma_{max} = q \cdot e^{-2\alpha_1 a} \qquad (2)$$

where
q is the coefficient of capacity of the binder,
$\alpha_1$ is the absorption coefficient of the substance from which the particles are formed.

The time t necessary for recording and fixing the image is determined by $$t = t_1 + t_2 \qquad (3)$$

$$t_1 = 10 \cdot \frac{a^2}{K} \cdot \rho \cdot C \qquad (4)$$

where
$t_1$ is the time taken by heat diffusion,
$t_2$ is the time necessary for joining the particles under the action of a force field,
K is the thermal conductivity coefficient,
$\rho$ is the density, and
C is the heat capacity.

The time $t_2$ is dependent upon the binder viscosity $\eta$ and the energy consumed by the particles to interact with an external force field, and is assumed to be less than the time $t_1$. Therefore, the time $t_3$ necessary for image recording is determined by the time $t_1$, these values being related to each other as follows in the case of a heterogeneous mixture:

$$t_1 \longrightarrow t_3 = 10 \frac{a^2}{\sqrt{K_1 \cdot K_2}} \rho_1 \rho_2 C_1 C_2 \qquad (5)$$

where $K_1$ is the thermal conductivity coefficient of the substance from which the particles are formed, $K_2$ is the thermal conductivity coefficient of the substance from which the binder is formed, $\rho_1$ is the density of the particle substance, $\rho_2$ is the density of the binder substance, $C_1$ is the heat capacity of the particle substance, and $C_2$ is the heat capacity of the binder substance.

The energy W consumed during the image recording is determined by $$W = \frac{P \cdot t_3}{S} \qquad (6)$$

where

P is the power of radiation absorbed by spherical particles, and

S is the illuminated area of the layer of the heterogeneous mixture.

The relationship between the radiation power P in the case of the spherical particles absorption and the temperature to which the solvent is heated within the time interval $t_3$ is determined by (cf. an article by Goldenberg and Tranter in the British Journal of Applied Physics, 3, p. 296, 1952):

$$\frac{P}{S} = 4\frac{r}{a^2} K_2 \cdot \Delta T_o \qquad (7)$$

where r is the distance from sphere center, and $T_o$ is the temperature increment.

With $r \approx a$, substitute (5) and (7) in (6) to obtain the following:

$$W = 40a \cdot \Delta T_o \cdot \sqrt{\frac{K_1}{K_2}} \cdot \sqrt{\rho_1 \rho_2 \cdot C_1 \cdot C_2} \qquad (8)$$

This simplified solution does not take into consideration the parameter variation occurred during the aggregate conversion since it does not affect considerably the obtained result. The radiant energy from the object, which is required for image recording, is reduced by adding a substance processing photoconductivity properties or photochemically active substances to the heterogeneous mixture.

If the radiation impinges on those portions of the layer which contain the above-mentioned substances, the energy relationship $\epsilon$ is determined by:

$$\epsilon = \frac{W_1}{W} \qquad (9)$$

where $W_1$ is the density of the energy developed during the illumination of a photoconductor connected to a current source or due to the interaction of photochemically active substances.

The density $W_1$ of the energy developed in a photoconductor stimulated by light is determined by:

$$W_1 = \frac{E^2 \cdot t_3}{\delta \cdot 1} \qquad (10)$$

where

E is the voltage across the photoconductor, 67 is the conductivity of the photoconductor dependent upon the radiant intensity, 1 is the thickness of the photoconductor layer.

68 is therefore given by:

$$\epsilon = \frac{E^2 \cdot S}{\delta \cdot 1 \cdot P} \qquad (11)$$

The density $W'_1$ of the energy developed in the substance mixture during a photochemical reaction is calculated according to the Van't Hoff-Einstein law:

$$W_1' = \frac{P_o(1 - e^{-\alpha l'})t_3}{h \cdot f \cdot S} \cdot \frac{\Sigma \gamma_i \cdot \Delta H_i}{N} \qquad (12)$$

where $P_o$ is the incident light power, $\alpha$ is the absorption coefficient of the photochemically active substance, $1'$ is the thickness of the layer of the photochemically active substance, $\eta$ is the Planck constant equal to $1.05 \cdot 10^{-27}$ erg/s, f is the radiation frequency, $\gamma_i$ is the quantum efficiency of the ith partial photochemical reaction, $\Delta H_i$ is the heat of formation of a chemical compound available during the ith exothermic photochemical reaction, N is the Avogadro number equal to $6.025 \cdot 10^{23}$ 1/mole.

$\epsilon$ is thus determined by $$\epsilon = \frac{\Sigma_i \cdot \gamma_i \cdot \Delta H_i}{N \cdot h \cdot f}(1 - e^{-\alpha l'}) \qquad (13)$$

A double inequality is used to determine the time $t_4$ within which the exposed layer of the heterogeneous mixture is given an additional exposure to rewrite the produced image with brightness intensification:

$$t_o \lesssim t_4 < t_5 \qquad (14)$$

where $t_o$ is the lag time of the image detector, and $t_5$ is the irradiation time within which the quality of the produced image deteriorates.

If the produced image is fixed and the additional exposure fails to heat the heterogeneous mixture to the temperature of the aggregate conversion or if the image is not fixed but the irradiation from the additional exposure is not absorbed by the heterogeneous mixture, then the time $t_5$ is indefinite. In this case, the intensification coefficient G corresponding to the image transfer condition is given by:

$$G = \frac{1}{D} \cdot \frac{P_3}{P_{min}} \qquad (15)$$

where

D is the maximum brightness relationship concerned with the elemental fragments of the recorded image.

If the produced image is not fixed and if the additional exposure is able to heat the heterogeneous mixture to a temperature exceeding that of the aggregate conversion, the time $t_5$ is determined by:

$$P_1 t_5 \lesssim P_{min} t_3 \qquad (16)$$

where $P_{min}$ is the minimum power of the radiation absorbed during the image recording.

Hence the intensification coefficient G in the case of the image transfer is given by:

$$G = \frac{P_1}{P_{min}D} \lesssim \frac{t_3}{t_5} \cdot \frac{1}{D} < \frac{1}{D} \cdot \frac{t_3}{t_o} \quad (17)$$

Embodiments of the invention will now be described by way of the following Examples.

EXAMPLE 1

A heterogeneous mixture of substances is prepared as follows. A paraffin 1 (FIG. 2) serves as a binder of the heterogeneous mixture and particles 2 are small magnetic particles of ferric oxide capable of almost full absorption of the incident luminous flux. A thin layer, 20 to 30 μm thick, of the heterogeneous mixture is formed on a glass substrate 3, is covered by a glass plate 4 and is then positioned near an external heat source 5. The produced layer is practically opaque due to the availability of the ferric oxide particles 2. A force field is a magnetic field H established at right angles to the layer surface. An image of an object, from which the luminous flux L (FIG. 3) is emitted towards the layer, is projected on to the latter. In those areas of the layer which receive more light the particles 2 are given more heat and vice versa. After heating, the particles 2 tend to heat up the paraffin 1 which surrounds them. After the paraffin 1 assumes a temperature exceeding its melting point, its viscosity decreases with the result that the position of the particles 2 influenced by the magnetic field H is varied. The particles 2 present in the most heated areas of the layer reorganize their position completely and appear now in the form of long thin threads 6 oriented in the direction of the magnetic field H, namely, at right angles to the layer surface. This results in a condition in which these areas of the layer become transparent to almost their fullest extent since the area occupied by the particles 2 which are opaque is reduced and the thin layer of the paraffin 1 passes almost all of the total luminous flux L impinged on it. On the other hand, half-tones are now present in those areas of the layer which are given less heat and therefore feature less transparence.

Figure 2:
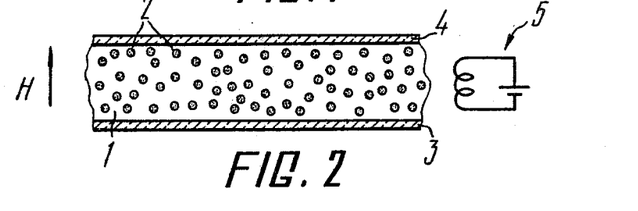
FIG. 2 shows a lateral section of a layer of a heterogeneous mixture and a heat source, according to the invention.
Figure 3:
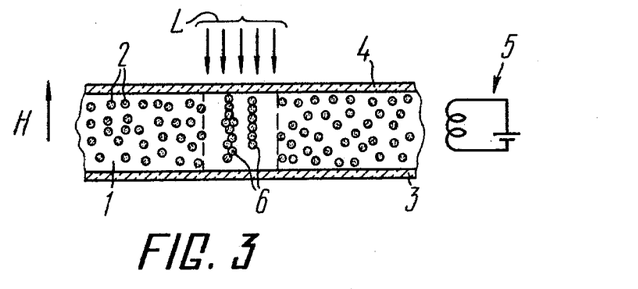
FIG. 3 shows a lateral section of a layer of a heterogeneous mixture, unevenly illuminated, and a heat source, according to the invention.

The image is then fixed by cooling down the layer to a temperature less than the crystallization point of the paraffin 1. As a result, the completed positive image is produced in the layer of the heterogeneous mixture comprised of the paraffin 1 and the ferric oxide particles 2.

EXAMPLE 2

The steps described in Example 1 are performed using ice as a solvent of a heterogeneous mixture and using a refrigeration source instead of the heat source of Example 1. This provides for the production of the completed positive image in the layer of the heterogeneous mixture comprised of ice and ferric oxide particles 2.

EXAMPLE 3

The steps described in Example 1 are performed using an artificial ice as a binder of a heterogeneous mixture. At normal pressure and at a temperature close to 18° C., this artificial ice is able to transit from the solid state to the gaseous one. As a result, a positive image is produced in the layer of the heterogeneous mixture comprised of the artificial ice and ferric oxide particles 2.

EXAMPLE 4

A paraffin 1 (FIG. 2) is used as a binder of a heterogeneous mixture and particles 2 are small magnetic particles of ferric oxide. A force field is the earth gravitational field. A thin layer of the heterogeneous mixture is formed on a glass substrate 3, is covered by a glass plate 4 and is then positioned near an external heat source 5.

The layer is heated to a temperature equal to the melting point of the paraffin 1 and an external magnetic field H is established at right angles to the layer surface. This results in the formation of long thin threads 6 (FIG. 3) from the particles 2, these threads 6 being oriented in a direction perpendicular to the layer surface. The layer is allowed to be cooled down to a temperature equal to or lower than the crystallization point of the paraffin 1. The produced layer is practically transparent since the surface density of the particles 2 in the opaque state is low. An image of an object is projected onto the layer with the result that the particles 2 in the layer are heated unevenly. In those areas of the layer which receive more light the particles 2 are given more heat and vice versa. After heating, the particles 2 tend to heat up the paraffin 1 which surrounds them. After the paraffin 1 assumes a temperature exceeding its melting point, its viscosity decreases and the particles 2 change their position influenced by the force of gravity and the convection currents established in the liquid paraffin. The particles 2 available already in the form of the long thin threads 6 are being disordered completely in the most heated areas of the layer. In these areas, the layer becomes opaque to almost its fullest extent since the area occupied by the particles 2 which are opaque is increased. Half-tones now appear in those areas of the layer which are given less heat and therefore feature less opacity. The layer is cooled down to a temperature lower than the crystallization point of the paraffin 1. As a result, the completed negative image is produced in the layer of the heterogeneous mixture comprised of the paraffin 1 and ferric oxide particles 2.

EXAMPLE 5

A paraffin 1 is used as a binder of a heterogeneous mixture and particles 2 are small opaque particles of barium titanate. A force field is established which is an electric field extending at right angles to the layer surface. A thin layer of the heterogeneous mixture is formed on a glass substrate 3, is covered by a glass plate 4 and is positioned near an external heat source 5.

The following steps are performed as per Example 1.

EXAMPLE 6

A paraffin 1 (FIG. 4) is used as a binder of a heterogeneous mixture and particles 2 are ferric oxide particles. A force field is established which is a magnetic field. Chlorine and hydrogen are used as photochemically active substances which are introduced, in dark room, in microcapsules 7 made of a transparent polyvinyl chloride. A layer of the heterogeneous mixture is formed and is placed on a substrate 3. Another layer is formed from the microcapsules 7, is deposited onto the first layer and is covered by a glass plate 4. An image of an object is projected onto the second layer. The lighting of the mixture of the chlorine and hydrogen causes an exothermic photochemical reaction. The resulting heat tends to heat those areas of the first layer which are adjacent the illuminated areas of the second layer. The greater the amount of light incident upon the microcapsules 7 the higher the temperature of the above areas of the first layer.

The following steps are performed in a sequence described in Examples 1–3.

Figure 4:
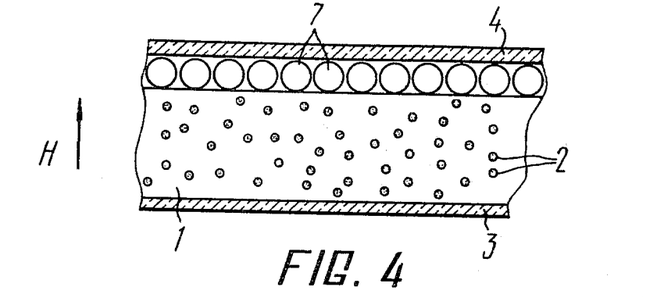
FIG. 4 shows a lateral section of a layer of a heterogeneous mixture and a microcapsules layer disposed on the first layer, according to the invention.

After the image has been fixed, the both layers are illuminated so that the temperature at which the photochemical reaction takes place in the second layer makes it possible to maintain the temperature of the heterogeneous mixture below the melting point of the solvent.

EXAMPLE 7

Figure 5:
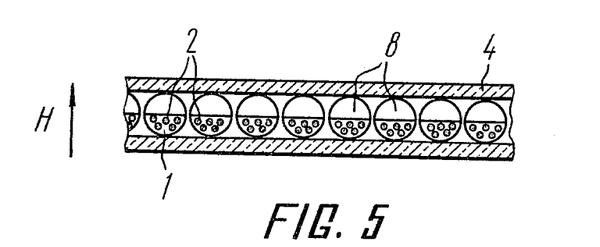
FIG. 5 is a lateral section of a layer of microcapsules containing a heterogeneous mixture and photochemically active substances, according to the invention.

Perform the steps described in Example 6 but introduce the photochemically active substances in microcapsules 8 (FIG. 5) together with the heterogeneous mixture.

EXAMPLE 8

Figure 6:
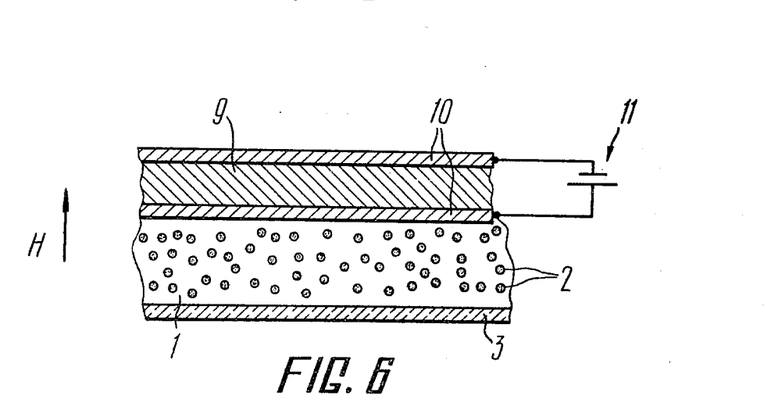
FIG. 6 is a lateral section of a layer of a heterogeneous mixture mounting a photoconductor plate, according to the invention.

A paraffin 1 (FIG. 6) and ferric oxide particles 2 are used to form a heterogeneous mixture. A force field is a magnetic field H. A thin plate 9 constructed from a CdS+Cu photoconductor is used as a substance possessing photoconductivity properties. The plate 9 is disposed between transparent electrodes 10 made of indium oxide and connected to a current source 11. An image of an object is projected on the plate 9. The light causes the resistance of the photoconductor to drop and a large current therefore flows through its illuminated areas. The resulting heat available in these illuminated areas tends to heat up the corresponding adjacent areas of the heterogeneous mixture layer. The greater the amount of light impinged on the photoconductor areas, the higher the temperature of the corresponding areas of the heterogeneous mixture layer.

The following steps are performed as per Examples 1–3.

EXAMPLE 9

The steps analogous to those described in Example 8 are performed but an image whose contrast is to be intensified is previously recorded on the layer of the heterogeneous mixture. Using an external light source (not shown), the layer of the heterogeneous mixture is so illuminated that a photoconductor plate 9 (FIG. 7) is held on the side void of illumination.

Figure 7:
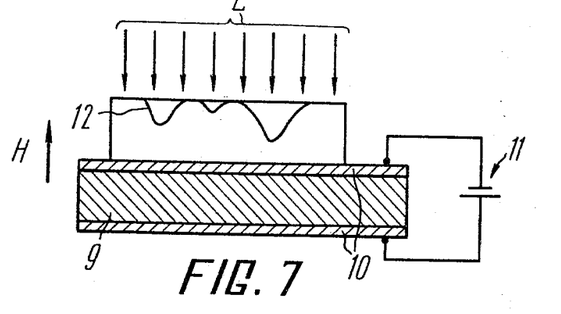
FIG. 7 shows a lateral section of a layer of an exposed heterogeneous mixture with a photoconductor plate, according to the invention.

FIG. 7 shows the contrast of the recorded image as represented by a curve 12.

If the luminous flux L from the external light source provides for an even illumination of the layer of the heterogeneous mixture, then the flux that is incident upon the plate 9 is dependent on the transparence of that layer. The higher the transparence of the given area of the heterogeneous mixture, the larger the amount of light which reaches the plate 9. The heat obtainable from the illuminated areas of the photoconductor tends to heat up the areas of the layer of the heterogeneous mixture which are adjacent the first-mentioned areas. Thus, the more transparent areas of the layer of the heterogeneous mixture possess a higher temperature.

The following steps are performed in accordance with Examples 1–3 and the contrast of the recorded image is therefore intensified.

If the luminous flux L from the external light source provides for an uneven illumination of the layer of the heterogeneous mixture, then the contrast of the recorded image can be additionally intensified or attenuated according to the procedure described.

EXAMPLE 10

A paraffin 1 is used as a binder of a heterogeneous mixture and particles 2 are needle-shaped magnetic particles of ferric oxide. A force field is a magnetic field. Carbon black deposited on the particles 2 offers a higher light absorbing capability as compared to that of ferric oxide.

The following operations are performed as per Examples 1–4, 9.

EXAMPLE 11

All the steps described in Examples 1–10 are performed but a light filter having an uneven spatial characteristic is arranged on the layer of the heterogeneous mixture.

The light filter is made as a layer of small grains of plexiglas each having a cross-section less than 10 $\mu$m. Each of the grains is colored red, green or blue. The grains are disposed on a transparent substrate in intimate contact with one another and serve as single-zone light filters during the photography and observation of the produced image. Due to its small size, each such grain cannot be observed by the eye. With the grains mixed randomly, the light filter so formed is represented as a grey object in transmitted light after the basic colors are processed by the eye. Small gaps between the grains are filled with a transparent adhesive and an image of an object is projected onto the light filter.

In the case, for example, of a red object, the light emitted by it is passed only through the red grains and is absorbed by the green and blue ones. As a result, the image is recorded only at those locations on the layer of the heterogeneous mixture which receive the projected beam passing through the red grains of the light filter.

The following steps are performed according to Examples 1–10.

If the produced image is observed from the light filter side, the former is perceived as a red one. Thus, the image is a due representation of the shape and color of the object and does not require further processing.

EXAMPLE 12

The steps described in Example 11 are performed. In example 12, however, thin walls of microcapsules, made of polyvinyl chloride and given one of the basic colors, or dyes introduced in transparent microcapsules 8 (FIG. 5) are used as a light filter. The microcapsules are mixed in a random manner and are arranged as a single layer and in intimate contact with one another on a transparent substrate 3. Each microcapsule 8 contains the heterogeneous mixture.

EXAMPLE 13

The steps described in Examples 1,2,5,8,10,11,12, are performed. In addition, a source (not shown in FIG. 8) producing an external variable magnetic field $H_1$ directed in parallelism with the surface of the layer of the heterogeneous mixture is located near that layer. In another embodiment, the layer is disposed on a piezoelectric transducer 13 connected to an ultrasonic oscillator 14.

Figure 8:
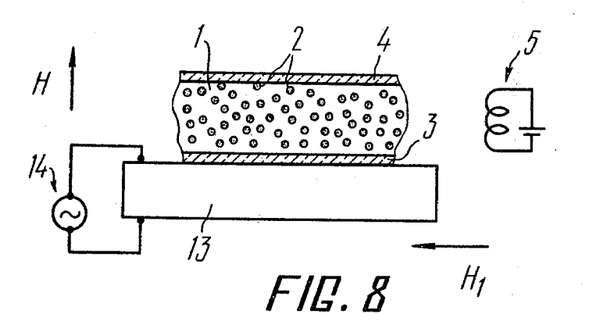
FIG. 8 shows a lateral section of a layer of a heterogeneous mixture and an ultrasonic oscillator, according to the invention.

After the image has been recorded, the layer of the heterogeneous mixture is heated up to the melting point of the paraffin 1 if the image is fixed (and is not heated up to that point if the image is not fixed) and an external magnetic field H directed at right angles to the layer surface is removed. After that, either the variable magnetic field $H_1$ is established or the ultrasonic oscillator 14 is energized for a short time interval. In any case, the particles of the mixture are mixed, which results in the erasing of the produced image and makes the layer of the heterogeneous mixture ready for the recording of a new image.

When photochemically active substances are used, the layer of the heterogeneous mixture and the microcapsules are protected from the incidence of light. In this case, part of the photochemically active substances does not react and can be used for multiple recording and erasing of images. As a result, the image can be recorded and erased many times on the same layer of the heterogeneous mixture of substances.

EXAMPLE 14

Figure 9:
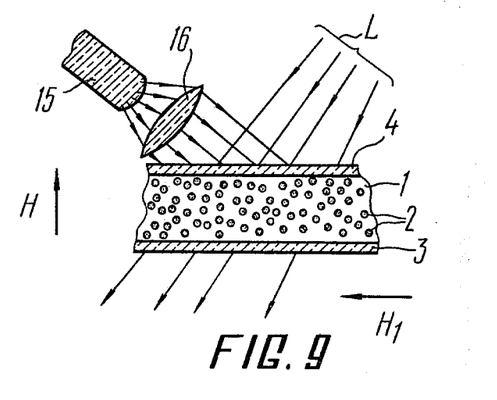
FIG. 9 shows a lateral section of a layer of a heterogeneous mixture and a light conductor, according to the invention.

The steps as described in Examples 1,2,5,8,10,11, are performed. In addition, a bright light source (not shown in FIG. 9) is located near the layer of the heterogeneous substances and an image obtainable from the end face of a light conductor 15 is projected through it and through a lens 16 as well on that layer. The image is recorded in accordance with the procedure described in Examples 1,2,5,8,10. After that, the bright light source is energized for a short time interval to illuminate the image with the result that an illumination is created on the layer which exceeds that available during the image recording. In this case, the image is rewritten on another layer with brightness intensification. The image so intensified is conveyed to the end face of another light conductor (not shown) for further transmission or is displayed on a screen. After the image has been transferred, it is erased from the layer of the heterogeneous mixture, according to the procedure described in Example 13, and a new image transmitted by the light conductor 15 is recorded. After that, the described steps are repeated again.

The images with intensified brightness are therefore transmitted on a real time basis so that their contrast characteristics, half-tones and colors are not changed.

It is known that the transmission of images through a light conductor is accompanied by light attenuation and distortion of multi-mode images due to dispersion encountered in the light conductor. To compensate for the distortion, use may be made of a corrector filter made as a plate that bears specific lines. This corrector filter provides for a reverse convolution of the image (cf. IEEE, Leith, 1, 1977, pp. 18–28). The shape of the lines with which the filter is provided is determined by using the known dispersion characteristic of the light conductor. The corrector filter is installed after the plate with the layer of the heterogeneous mixture when the image is to be intensified and the distortion due to transmission in a light conductor is to be corrected.

EXAMPLE 15

The steps as described in Example 14 are performed.

The image with the intensified brightness is projected onto a screen at a magnification allowing for visual observation. This provides for the following applications: TV transmissions and reception of images varying with time and requiring no conversion into electrical signals or vice versa; reception and further optical processing of images varying with time on a visual display; transmission and reception, on a large screen, of images of small objects observed through a conventional microscope; transmission and reception of images of distant objects with brightness intensification when viewing them through binoculars, conventional and astronomical telescopes and the like.

EXAMPLE 16

The steps as described in Example 14 are performed.

The image with the intensified brightness is projected on a screen through a multiplying means, for example, a diffraction grating, with the result that the source image is reproduced on a multiple basis at different locations on the screen. With the images of different objects previously recorded on the screen, it is possible, using the known correlation comparison method, to recognize immovable patterns. This means that a condition is discriminated in which the transmitted intensified image coincides with one of the images on the screen (cf. J. Goodman, "Introduction to Fourier Optics", McGraw-Hill Book Company, 1968).

Using this technique, telephone channels comprised of light conductors can be selected so that conventional step-type selectors are not required.

EXAMPLE 17

The steps as described in Example 14 are performed, but a hologram of an object, and not its image, is transmitted in this case.

The hologram with the intensified brightness is converted into a three-dimensional image using the known hologram reconstruction method (cf. J. Goodman, "Introduction to Fourier Optics", McGraw-Hill Book Company, 1968).

The simplified theory described above is a means for approximate evaluation of the characteristics of the proposed method of recording images on a radiation sensitive material.

Assume that a heterogeneous mixture comprises ferric oxide particles and paraffin which are characterized by the following parameters:

$a = 10^{-4}$ cm $M_o = 5.10^2$ —saturation magnitization of particle $K_1 = 2.10^{-1}$ W/cm.deg.

$K_2 = 4.10^{-4}$ W/cm.deg.

$\rho_1 = 5$ g/cm$^3$ $\rho_2 = 0.9$ g/cm$^3$ $C_1 = 0.9$ Joule/g.deg.

$C_2 = 1.4$ Joule/g.deg.

$\Delta T_1 = 1°$ C.

$\Delta T_o = 10^{-2} \Delta T_1$ $q = 2$ $\alpha = 10^5$ 1/cm

With the above values of the parameters substituted in (1), (2), (5), (8), we have: $R > 10^3$ line/mm, $\gamma_{max} > 10^3$, $t_3 \approx 5 \cdot 10^{-5}$s, $W \approx 5 \cdot 10^{-6}$ Joule/cm$^2$ The characteristics of the proposed method were tested as follows. A layer, 0.3 to 0.5 mm thick, of a heterogeneous mixture comprised of paraffin and ferric oxide particles was prepared and deposited on a polyvinyl chloride layer. The completed sample was introduced in a magnetic field having an intensity of 50 Oersteds and was heated up to 42° C. With the sample illuminated, images of people were produced using the projection printing from a positive film as well as images of laser beams and other objects.

The test results are as follows: $R \approx 10^2$ line/mm, $\gamma_{max} > 10^3$, $t_3 = 10^{-3}$s, $W = 10^{-5}$ Joule/cm$^2$ No variations in the fixed images were detected during their storage. The light utilization factor during the image observation was equal to about 80% and halftones were reproduced properly.

Better characteristics of the proposed method, especially the reduction of the energy required for the image recording, were obtained using substances possessing photoconductivity properties and photochemically active substances as well.

A CdS+Cu plate was used as a photoconductor and a current source was provided. The characteristics of that plate are as follows: $1 = 4 \cdot 10^{-4}$ cm; $E = 60$ V; $\delta = 10$ Ohm.cm at $P = 5 \cdot 10^{-3}$ W (cf. I-P. Khrumme, H. I. Schmitt, IEEE Transactions of Magnetics, No. 11, 1975, p. 1097).

With a minimum area of the image elemental fragment $S = 10^{-6}$ cm$^2$, (11) gives the following:

$$\epsilon = 1.8 \cdot 10^2$$

This means that the energy required for the image recording is decreased by a factor of 100 and more.

The photochemically active substances were chlorine and hydrogen introduced under a pressure into a microcapsule. If the radiation absorption by these substances obeys the Beer law, then we have:

$$\alpha = \alpha_o \cdot \frac{P}{P_o} \quad (18)$$

where $\alpha_o$ is the absorption coefficient at normal pressure $P_o$.

The parameters of the substances are as follows: $\gamma = 10^5$, $\Delta H = 4.5 \cdot 10^4$ cal/mole, $\alpha_o = 4$ 1/cm Assume that $P/P_o = 10^2$, microcapsule size $1 = 10^{-3}$ cm and radiation wavelength $\eta = 3 \cdot 10^{-5}$ cm. With these values substituted in (13), we have $$\epsilon = 10^5$$

This means that the energy required by the image recording is reduced by a factor of $10^5$ and amounts to $10^{-10}$ Joule/cm$^2$.

The image brightness intensification coefficient in the case of the rewriting of images with the help of an additional exposure was evaluated as follows.

If the irradiation of the additional exposure is not absorbed by the heterogeneous mixture, then the intensification coefficient, according to (15), is dependent only upon the radiation power of the additional exposure source and can rise with an increase in that power.

If the irradiation during the additional exposure is absorbed by the heterogeneous mixture, then the intensification coefficient is of a limited magnitude. For example, in the case of a TV transmission, the associated parameters are as follows:

$$D = 10^2, t_3 = 5 \cdot 10^{-2}s.$$

After substituting these values, with $t_o = 5 \cdot 10^{-5}$s, in (17), we have $G = 10$.

What is claimed is:

1. A method of recording images of a radiation sensitive material comprising the steps of:

forming a layer of radiation sensitive material comprised of a heterogeneous mixture of substances, at least one of said substances being used as a binder and being capable of converting its states of aggregation in the mixture of the type of crystal-liquid or crystal-gas under the action of intrinsic or reflected radiation obtainable from the object being recorded and at least one said substances which is used as a filler present in the heterogeneous mixture in the form of particles that are randomly arranged in the layer to assure its uniform optical density, said binder being in a solid state when free of exposure to radiation and holding said particles against migration and being capable of absorbing thermal radiation for converting into a liquid or gaseous substance, said particles being responsive to a force field and capable of absorbing radiation to melt that portion of the binder surrounding the particle which absorbs radiation for permitting the irradiated particles to migrate and to form chains that are extended along force field lines as a result of the interaction between the heated particles in a force field;

introducing said layer of said heterogeneous mixture of substances into an electric or a magnetic force field at right angles to the layer surface;

projecting onto said layer of said heterogeneous mixture of substances an image of an object being recorded with the help of the intrinsic or reflected radiation obtainable from the object being recorded to cause the heating of said particles on the illuminated sections of the layer, which heated particles then in turn melt the portion of the binder adjacent to the heated particles to permit the particles to migrate in response to the force field;

said projecting step also causing the converting of the state of aggregation of the binder surrounding the heated particles to either crystal-liquid or crystal-gas, thus enabling said heated particles to orient their position in the binder to aggregate in chains perpendicularly to the surface as a result of the interaction with said magnetic or said electric field; and fixing the projected image by converting the state of aggregation of the binder by switching off the recorded object radiation to cause the binder to cool and re-crystallize.

2. A method as claimed in claim 1, wherein said layer of said heterogeneous mixture of substances is heated or cooled, prior to the moment that the image is recorded, to a temperature close to that at which the substance serving as the binder changes its state of aggregation.

3. A method as claimed in claim 1, wherein said layer of said heterogeneous mixture of substances is heated or cooled, at the moment that the image is recorded, to a temperature close to that at which the substance serving as the binder changes its state of aggregation.

4. A method as claimed in claim 1, wherein the radiation absorbing substance having its radiant/thermal energy conversion factor greater than that of said particles is deposited onto said particles.

5. A method as claimed in claim 1, comprising the steps of:
forming a layer comprised of at least one radiation-absorbing substance having its radiant/thermal energy conversion factor greater than that of said particles; and
depositing said layer of said radiation-absorbing substance onto said layer of said heterogeneous mixture of substances.

6. A method as claimed in claim 1, wherein said binder is paraffin and said filler is ferric oxide particles.

7. A method as claimed in claim 2, wherein a radiation-absorbing substance having its radiant/thermal energy conversion factor greater than that of said particles is deposited onto said particles.

8. A method as claimed in claim 2, comprising the steps of:
forming a layer comprised of at least one radiation-absorbing substance having its radiant/thermal energy conversion factor greater than that of said particles; and
arranging said layer of said radiation-absorbing substance under said layer of said heterogeneous mixture of substances.

9. A method as claimed in claim 5, wherein said radiation-absorbing substances which are photochemically active are encapsulated into a plurality of microcapsules which are able to transmit radiation.

10. A method as claimed in claim 5, comprising the steps of:
(a) using a substance possessing photoeffect properties as the radiation absorbing material;
(b) arranging said substance possessing photoeffect properties beneath said layer of the heterogeneous mixture of substances; and
(c) subjecting said layer of the heterogeneous mixture of substances to an additional exposure after the image has been fixed.

11. A method as claimed in claim 9, wherein said plurality of microcapsules containing said photochemically active substances are arranged as a layer under said layer of said heterogeneous mixture of substances; and
said layer of said heterogeneous mixture of substances is subjected to an additional exposure after the image has been fixed.

12. A method as claimed in claim 9, wherein said microcapsules are made of a material of a single color as a minimum.

13. A method as claimed in claim 12, comprising the steps of:
subjecting the projected image to an additional exposure prior to its fixing;
setting the magnitude of the radiant intensity available during the additional exposure greater than that available during the image recording; and
selecting the radiation wavelengths which can pass through the heterogeneous mixture without absorption.

14. A method as claimed in claim 13, wherein the additional exposure time is less than the image record time by that number of times by which the radiant intensity available during the additional exposure exceeds that available during the image recording, provided the identical radiation wavelengths are used during the additional exposure and the image recording.

15. The method as claimed in claim 1, wherein said layer of heterogeneous mixture is preferably 20 to 30 μm thick.

16. The method as claimed in claim 1, wherein the viscosity of the binder decreases above the melting point thereof and the force field then varies the position of the particles.

17. A method of recording images of a radiation sensitive material comprising the steps of:
forming a layer of radiation sensitive material comprised of a heterogeneous mixture of substances, at least one of said substances being used as a binder and being capable of converting its state of aggregation in the mixture of the type of crystal-liquid or crystal-gas under thermal radiation and at least one of said substances which is used as a filler present in the heterogeneous mixture in the form of particles that are randomly arranged in the layer to assure its uniform optical density, said binder being in a solid state when free of exposure to radiation and holding said particles against migration and being capable of absorbing thermal radiation for converting into a liquid or gaseous substance, said particles being responsive to a magnetic field and capable of absorbing radiation to melt that portion of the binder surrounding the particle which absorbs radiation for permitting the irradiated particles to migrate and to form chains that are extended along force field lines as a result of the interaction between the heated particles in the magnetic field;
introducing said layer of said heterogeneous mixture of substances into the magnetic force field at right angles to the layer surface;
uniformly heating said layer of said heterogeneous mixture of substances to a temperature equal to the melting point of the binder in said layer thereby converting the state of aggregation of the binder surrounding the heated particles to either crystal-liquid or crystal-gas, thus enabling said heated particles to orient their position in the binder to aggregate in chains perpendicular to the surface as a result of the interaction with said magnetic field;
a solidified transparent layer is formed by cooling said layer to a temperature equal to or below the solidification temperature of the binder, and then turning off the magnetic field;
projecting onto said solidified transparent layer an image of an object being recorded with the help of the intrinsic or reflected radiation obtainable from the object being recorded to cause the heating of said particles on the illuminated sections of the layer, which heated particles then in turn melt the portion of the binder adjacent to the heated particles to permit the particles to migrate under gravitational field alone;
said projecting step also causing the converting of the state of aggregation of the binder surrounding the heated particles to either crystal-liquid or crystal-gas, thus enabling said heated particles to orient their position in the binder in a disorderly manner perpendicularly to the layer surface under gravitational field alone; and
fixing the projected image by converting the state of aggregation of the binder by switching off the recorded object radiation to cause the binder to cool and recrystallize.

* * * * *

UNITED STATES PATENT AND TRADEMARK OFFICE
CERTIFICATE OF CORRECTION

PATENT NO. : 4,293,634
DATED : October 6, 1981
INVENTOR(S) : Yakov A. Monosov

It is certified that error appears in the above—identified patent and that said Letters Patent is hereby corrected as shown below:

Column 6, line 31, change "$\frac{2\pi}{\Delta}$" to --$\frac{2\pi}{\lambda}$--;

Column 7, line 39, change "$\frac{K_1}{K_2}$" to --$\frac{K_2}{K_1}$--;

Column 8, line 2, change "67" to --$\delta$--;

Column 8, line 5, change "68" to --$\epsilon$--;

Column 8, line 15, change "$W_1'$" to --$W'_1$--;

Column 8, line 35, change "h" to --$\eta$--.

Signed and Sealed this

Fourteenth Day of September 1982

[SEAL]

Attest:

GERALD J. MOSSINGHOFF

Attesting Officer     Commissioner of Patents and Trademarks